(12) United States Patent
Kenney

(10) Patent No.: US 7,874,705 B2
(45) Date of Patent: Jan. 25, 2011

(54) COVER FOR A LUMINARY DEVICE

(76) Inventor: Marnie Deacon Kenney, 3227 Volta Place, NW., Washington, DC (US) 20007

( * ) Notice: Subject to any disclaimer, the term of this patent is extended or adjusted under 35 U.S.C. 154(b) by 293 days.

(21) Appl. No.: 12/243,173

(22) Filed: Oct. 1, 2008

(65) Prior Publication Data
US 2009/0086494 A1    Apr. 2, 2009

Related U.S. Application Data

(60) Provisional application No. 60/976,540, filed on Oct. 1, 2007.

(51) Int. Cl.
*F21V 11/00* (2006.01)
(52) U.S. Cl. .................. 362/351; 362/253; 362/360; 362/361; 362/806
(58) Field of Classification Search .............. 362/253, 362/351, 360, 361, 806
See application file for complete search history.

(56) References Cited

U.S. PATENT DOCUMENTS

| | | | |
|---|---|---|---|
| 1,728,166 A | 9/1929 | Hortone | |
| 1,733,451 A | 10/1929 | Dixon | |
| 1,998,769 A | 4/1935 | Partridge | |
| 4,817,315 A | 4/1989 | Kammerer et al. | |
| 5,975,725 A | 11/1999 | Ireland-Stacy | |
| 7,347,593 B1 | 3/2008 | Swanson | |
| 7,373,744 B1 | 5/2008 | Wagner | |
| 1,459,715 A1 | 10/2008 | Bliss | |
| 2006/0050517 A1 | 3/2006 | LaFleiche et al. | |
| 2007/0109793 A1 | 5/2007 | Lin | |
| 2007/0121330 A1 | 5/2007 | Joseph | |
| 2008/0030995 A1 | 2/2008 | Chen | |

FOREIGN PATENT DOCUMENTS

GB    2183387 A    6/1987

*Primary Examiner*—Sandra L O Shea
*Assistant Examiner*—Meghan K Dunwiddie
(74) *Attorney, Agent, or Firm*—Edell, Shapiro & Finnan, LLC

(57) ABSTRACT

The present invention is directed toward a cover for an illumination device including a composite image including selectively visible design elements. The exterior surface of the cover may include a design element viewable regardless of whether the light source is extinguished or illuminated. The interior surface of the cover may further include a design element that is viewable on the exterior surface only when the light source is illuminated. Thus, when a viewer views the exterior of the lamp generally in elevation, the cover selectively displays different designs to the viewer depending on the illumination state of the device.

26 Claims, 4 Drawing Sheets

COVER FOR A LUMINARY DEVICE

CROSS REFERENCE TO RELATED APPLICATIONS

This application claims priority to U.S. Provisional Patent Application No. 60/976,540 filed 1 Oct. 2007 and entitled "Cover for a Luminary Device and Method of Forming", the disclosure of which is hereby incorporated by reference in its entirety.

FIELD OF THE INVENTION

The present invention relates generally to covers for luminary devices having selectively-viewable composite image portions and, in particular, to lampshades configured to selectively display image portions to a viewer.

BACKGROUND OF THE INVENTION

Lamps and their corresponding lampshades are well known and widely used in a variety of settings. For example, lamps can be used to provide all of the lighting requirements in a specified area, to supplement overhead lighting or as a decorative element within a room. Lamps are available in a wide variety of configurations including floor lamps, desk lamps and many alternative configurations. A typical lamp assembly includes a base member, an electrical assembly (including a switch and bulb assembly), and a lampshade.

Lampshades provide the overall visual appearance of a lamp assembly. Lamps and lampshades are often specifically selected for use due to their overall visual appearance as opposed to operation characteristics. As such, lampshades are available in a wide variety of different styles that can make use of differing materials of construction as well as differing shapes and sizes. In addition, lampshades can be selected to have desired colors and patterns. In some instances, lampshades can be selected that include hand-painted scenes or pictures along its exterior (viewing) side.

Thus, lampshades serve as important ornamental details in a room or home interior design. Manufacturers offer lampshades in a wide variety of materials and designs. Nevertheless, there is always a need for an improved lampshade that has unique visual appeal and can be produced in a wide variety of ornamental designs.

SUMMARY OF THE INVENTION

The present invention is directed toward a cover for a luminary device including a selectively visible image portions. The cover may be in the form of a lampshade including a body with an exterior surface and an interior surface. The exterior surface may include a design element viewable regardless of whether the light source is extinguished or illuminated. The interior surface may further include a design element that may be viewable on the exterior surface only when the light source is illuminated. In operation, when viewing the exterior surface of the lamp, a viewer sees only a portion of the complete image when the light source is extinguished (i.e., only the exterior design element). When the light source is illuminated, however, the viewer sees a complete image on the exterior surface (i.e., a composite image including both the interior and exterior design elements).

BRIEF DESCRIPTION OF THE DRAWINGS

Like reference numerals have been used to identify like elements throughout this disclosure.

DETAILED DESCRIPTION OF THE INVENTION

Figure 1A:
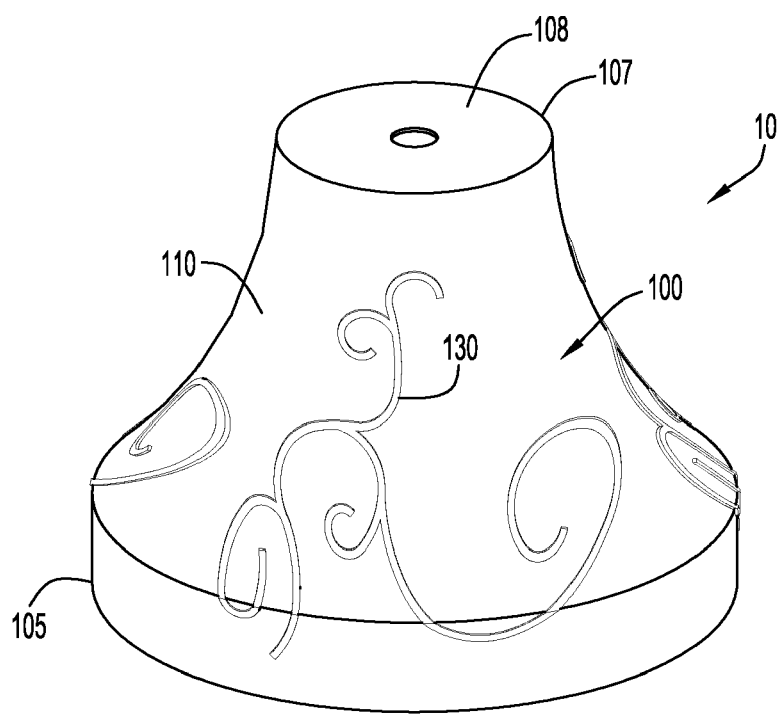
FIG. 1A illustrates a top perspective view of a cover for a luminary device in accordance with an embodiment of the invention.
Figure 1B:
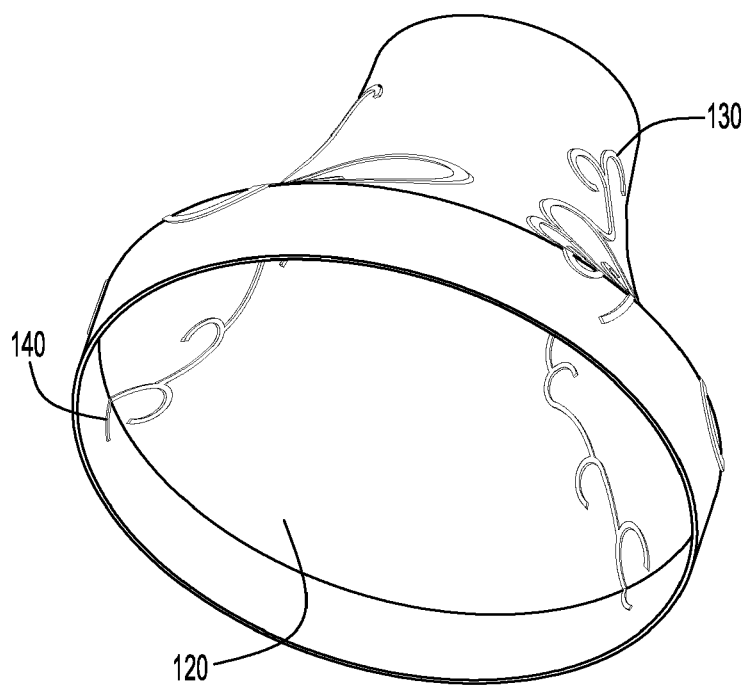
FIG. 1B illustrates a bottom perspective view of the cover of FIG. 1A, showing the interior design element.

FIG. 1A illustrates a top perspective view of a cover for a luminary device in accordance with an embodiment of the invention, while FIG. 1B illustrates a bottom perspective view. As shown, the cover 10 may be in the form of a lampshade including a body 100 defining an interior channel having a lower end or rim 105 and an upper end or rim 107. In the embodiment illustrated, the lower end 105 is opened and the upper end 107 is closed. That is, the upper end 107 includes a cap 108 with an aperture to permit the escape of heat and/or to provide an insertion point for a supporting and/or electrical cord. It should be understood, however, that both ends 105, 107 may be closed or opened. The body 100 may possess a unitary (one-piece) structure having a substantially consistent thickness throughout.

Figure 2:
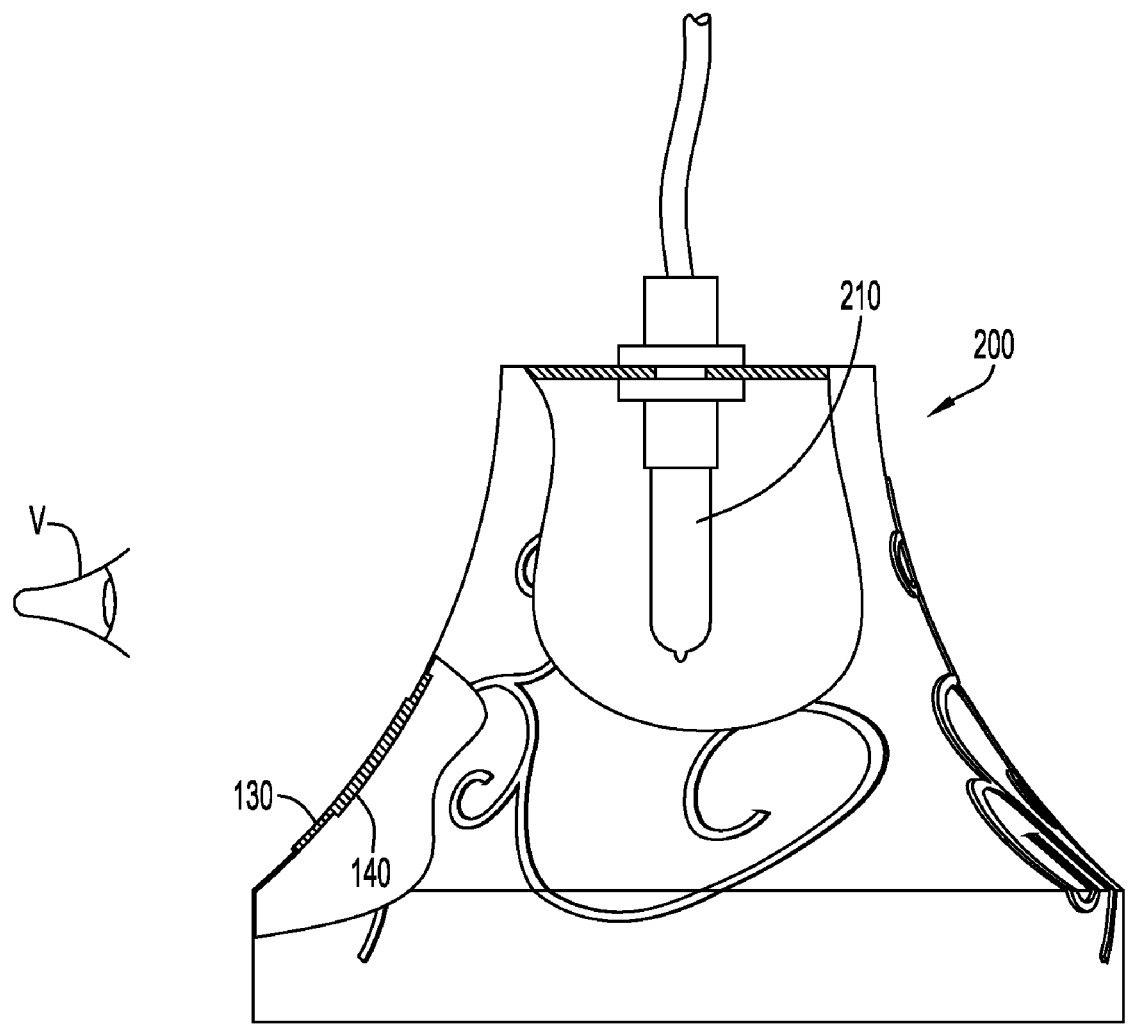
FIG. 2 illustrates a cross-sectional view of the cover of FIG. 1A.

The body 100 further possesses a first or exterior surface 110 and a second or interior surface 120. FIG. 2 illustrates a cross-sectional view of an illuminating device 200 (e.g., a lamp assembly) including a light source 210 and the cover 10 of FIG. 1A. As shown, the exterior surface 110 is oriented toward a viewer V of the lampshade, while the interior surface 120 is oriented toward the light source 210 (e.g., a light bulb). The exterior surface 110 includes a first or exterior design element 130. The interior surface 120, similarly, includes a second or interior design element 140.

Each portion of the cover 10—the body 100, the exterior design element 130, the interior design element 140—are configured to possess predetermined light transmission properties. That is, each portion 100, 130, 140 allows a predetermined percentage of incident light to pass through the cover 10 to enable the selective display of the design elements 130, 140 to a viewer viewing the exterior surface 110 of the body 100. By way of example, the exterior design element 130 and the interior design element 140 may possess one light transmission value, while the body 100 (i.e., the portions of the body not including the design elements) may possess a different light transmission value. By way of further example, the exterior design element 130, the interior design element 140, and the body 100 may each possess different light transmission values (e.g., when viewed from the outside of the lamp).

Figure 3:
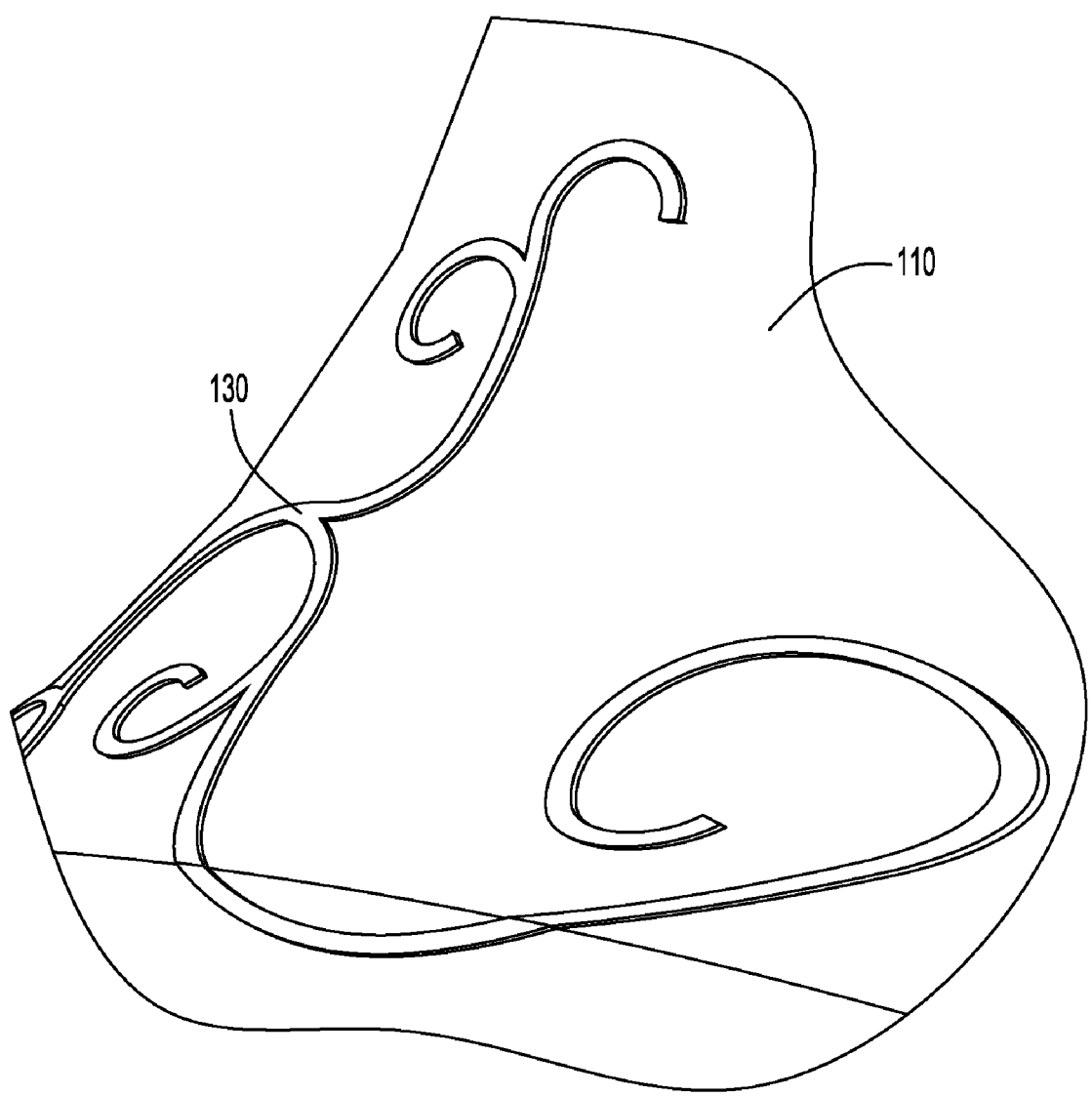
FIG. 3 illustrates a close-up of the exterior surface of the cover of FIG. 1A, showing a protruding design element.

In one embodiment, each portion 100, 130, 140 possesses a predetermined thickness value configured to provide the desired light transmission values. That is, each design element 130, 140 either protrudes from or is recessed into the surfaces 110, 120 of the body 100 to create areas of varying thickness along the body. FIG. 3 is a close-up view of the exterior design element 130 in accordance with an embodiment of the invention. As shown, the exterior design element 130 may be defined by a raised area or rib (also called a protrusion) extending from the exterior surface of the body 100. Also, as shown, the rib may be integral with the body 100 (creating a cover having a unitary structure). Similarly, the interior design element 140 may be defined by a raised area or rib extending from the interior surface 120 of the body 100.

While ribs are illustrated, it should be understood that the design elements 130, 140 may be defined by a recess or groove formed into the surfaces 110, 120 of the body 100 (not illustrated).

As noted above, the relative thicknesses of the design elements 130, 140 and the body 100 may be selected to provide the desired light transmission values. By way of example, when the thickness of the body 100 is about 1 mm, the thickness of each protruding design element 130, 140 may also be about 1 mm (thus the thickness of an area of the cover 10 including the design element is about 2 mm, while the remaining (normal) portions of the body are about 1 mm). By way of further example, when the thickness of the body 100 is about 3 mm, the thickness of each protruding design element 130, 140 may also be about 3 mm (thus the thickness of an area of the cover 10 including the design element is 6 mm). Thus, the ratio of thicknesses of the body 100 including a protruding design element 130, 140 with respect to the normal thickness of the body 100 (i.e., the thickness not including the design elements) may be about 2:1.

When a recess or groove forms the design element 130, 140, the ratio of thickness of the recessed design element 130, 140 with respect to the normal body portion (i.e., the portion of the body 100 not including the design) may be about 1:2. That is, the depth of recessed design element 130, 140 is no more than half the normal thickness of the body 100. Any recessed design elements are configured such that none extend completely though the body 100 (i.e., apertures do not define any feature of the design elements).

Stated another way, the thickness value T1 of the body 100 measured at a point including an exterior design element 130 differs from the thickness value T2 of a normal body portion, i.e., the body 100 at a point not including the exterior design element 130. This variation in thickness alters the light transmission properties of the body 100. As a result, the body 100 at thickness T1 transmits light at a first transmission value, while the body 100 at thickness T2 transmits light at a second transmission value, which is different from the first transmission value. Similarly, the thickness value T3 of the body 100 measured at a point including an interior design element 130 differs from the thickness value T2 of a normal body portion. As such, it possesses a third light transmission value. In this manner, the design elements 130, 140 possess a different light transmission value from the normal body area.

The material forming the cover may be any material capable of transmitting light from the light source in predetermined amounts, and may be formed from material that is transparent, semitransparent, or translucent. For example, the material may include, but is not limited to, glass, plastic, etc. For example, the plastic material may be a thermoplastic resin including, but not limited to acrylonitrile butadiene styrene; polyvinyl chloride; polypropylene (e.g., polypropylene, talc-filled polypropylene, calcium filled polypropylene, and polypropylene copolymers); polyethylene (low-density polyethylene (LDPE), linear low-density polyethylene (LLDPE), high-density polyethylene (HDPE), ultra high molecular weight polyethylene (UHMWPE)); polyamide, polyester; and polycarbonate.

The cover 10 may be formed utilizing processes that produce a seamless, unitary body 100 including the design elements 130, 140. For example, molding techniques such as injection molding, co-injection molding, profile extrusion, ram extrusion, injection molding, co-injection molding, and blow molding may be utilized. By way of further example, the cover 10 may also be formed utilizing processes such as glass blowing, molding, etc. In the glass molding process, a mold is created with the negative of the design elements 130, 140 etched or embossed into the mold. Glass is poured into the mold and hardens with both designs 130, 140 being a permanent, integral part of the structure. In the glass blowing process, a body 100 of glass is formed, and the design 130, 140 is etched into the glass (i.e., the etching step takes place after the body of the cover is formed). Alternatively, to create a raised design, molten glass could be placed on the surface of the body and allowed to harden (i.e., the design is created separately, yet applied while the glass is still warm so that the final structure is again a unitary structure with a permanent design).

By way of still further example, the cover 10 may also be formed via a computer controlled cutting or building process such as machines using computer numerical control (CNC), and selective laser sintering (SLS), and/or stereolithography (SLA). In a selective laser sintering (SLS) process, a $CO_2$ laser sinters (fuses) a powder material (e.g., nylon or other material), with the laser tracing an object's cross sectional geometry layer by layer.

Stereolithography is a 3D laser printing technique that produces 3D objects by hardening (polymerizing) a photosensitive epoxy resin. Stereolithography uses a vat of liquid, UV-curable photopolymer resin and a UV laser to build parts a layer at a time. On each layer, the laser beam traces a part cross-section pattern on the surface of the liquid resin. Exposure to the UV laser light cures the pattern traced on the resin, adhering it to the layer below.

Furthermore, three dimensional inkjet printing may be utilized. In 3D inkjet printing, layers of a fine powder (e.g., resins) are selectively bonded by "printing" a water-based adhesive from the inkjet print head in the shape of each cross-section as determined by a computer aided design file.

With this configuration, the body 100 possesses a unitary, seamless structure having sufficient structural support and heat resistant characteristics. The resulting lampshade, moreover, is configured to selectively display a composite image of individual design elements to a viewer of the lamp assembly. That is, the lampshade operates in a first mode, in which only the exterior design element 130 is viewable on the exterior surface 110 of the body, and a second mode, in which a composite image including both the exterior design element 130 and the interior design element 140 are viewable on the exterior surface 100.

Figure 4A:
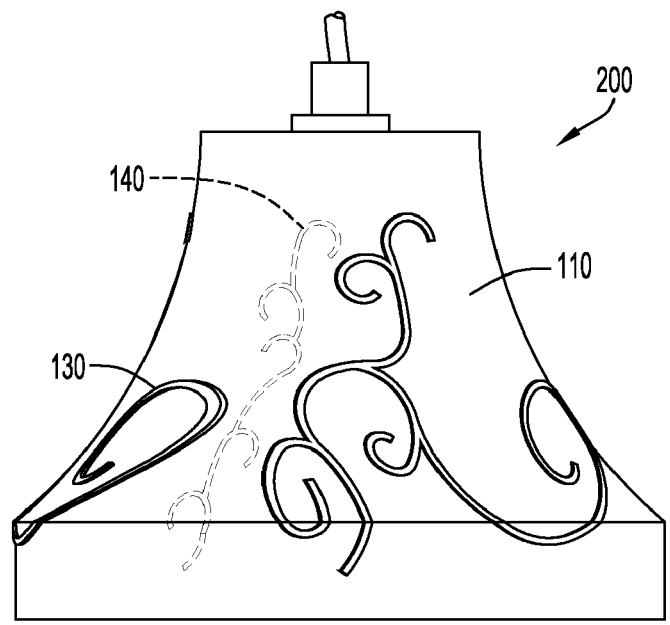
FIG. 4A is a perspective view of a lamp assembly including the cover of FIG. 1A, with the light source in an extinguished state and showing the interior design element in phantom.
Figure 4B:
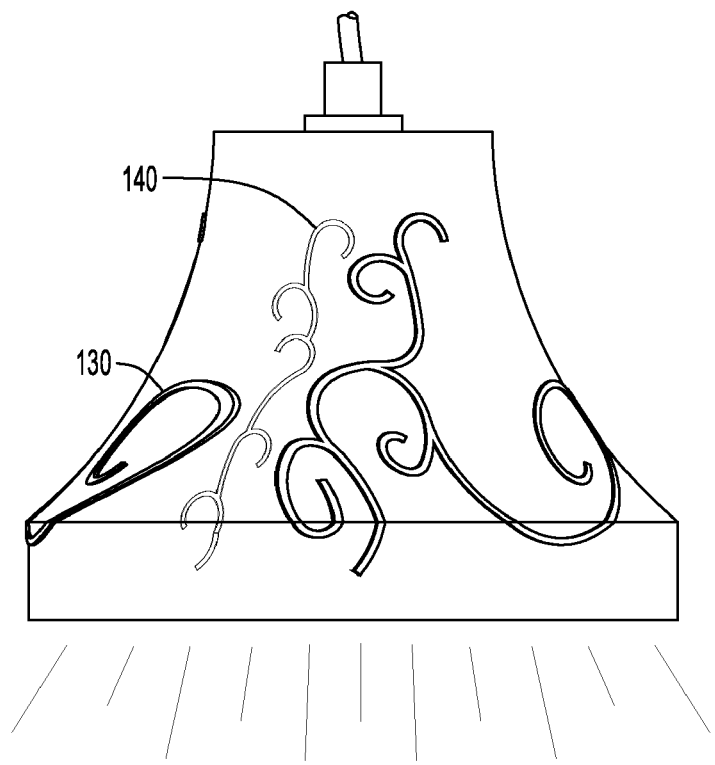
FIG. 4B is a perspective view of the lamp assembly of FIG. 4A, with the light source in an illuminated state and showing the composite image.

The operation of the cover is explained with reference to FIGS. 4A and 4B. FIG. 4A illustrates a lamp assembly 200 including a cover 10 with an exterior design element 130 and an interior design element 140 (shown in phantom in FIG. 4A). The light source 210 is extinguished; consequently, the interior design element is not visible to the viewer. That is, the when light source is extinguished, only the first or exterior design element 130 is displayed (FIG. 4A) to a viewer of the cover exterior. When the light source is illuminated, however, light is transmitted from the light source 210 and through the body 100. Due to the varying light transmission properties of the body 100, the exterior design element 130, and the interior design element 140, light is transmitted through the body at varying rates. Consequently, both the exterior design element 130 and the interior design element 140 are visible to a viewer of the cover exterior.

With this configuration, portions of a design formed into the cover 10 are selectively displayed to a viewer of the cover exterior. Specifically, when the interior surface 120 of the body 100 is illuminated, the exterior 130 and interior 140 design elements combine into a single, composite design displayed to a viewer of the cover. This, in turn increases the visual appeal of the lamp, since one design configuration is displayed when the light source is extinguished, but another design configuration is displayed when the light source is illuminated.

The cover of the present invention may be mounted on a conventional electric lamp to form a lamp assembly. By way of example, the lamp may include a base that supports a light source. A harp may be attached to the base to support the lampshade assembly over the bulb. By way of further example, the lamp may be a pendant lamp or a sconce (as seen in FIG. 2).

While the invention has been described in detail and with reference to specific embodiments thereof, it will be apparent to one skilled in the art that various changes and modifications can be made therein without departing from the spirit and scope thereof. For example, the type of light source is not limited, and includes incandescent, compact fluorescent, LED, and xenon light sources. The body 100 may possess any shape and have any suitable dimensions. While a generally frustaconical shape is illustrated, the cover may possess other shapes such as ovals, polygons, etc. The shape may include a closed end and an open end (as illustrated), or may include open ends. In addition, the cover 10 may have a generally annular shape (being a closed ring) or may be an open ring. The cover 10, moreover, may be in the form of light covers other than lampshades (e.g., night light covers, flat panel covers, etc.).

The material forming the cover 10 include any suitable for the purpose described herein. While a moldable material is preferred, other materials (pulp, cotton, woven webs, and other natural and synthetic materials may be utilized).

The exterior design element 130 and interior design element 140 may possess any suitable shape or dimensions for the purposes the described herein. The design elements 130, 140 may be engraved or embossed (thus recessed into the surface 110, 120 of the body 100), or may be built up to extend/protrude from the surface of the body.

The design elements 130, 140 may be integral with the body 100 (as described), or may be separate components connected to the surfaces 110, 120 of the body. The design elements may include any combination of recesses or protrusions formed into or coupled to the body 100. For example, the cover 10 may include a third design element comprising a groove recessed formed into the interior or exterior surface of the body 100, the third design element being selectively used in combination with raised exterior 130 and interior 140 design elements.

Any method suitable to vary light transmission values may be utilized. While providing predetermined thickness values for of the embossed/protruding design elements 130, 140 and the normal body portions of the cover 10 is utilized, any configuration that permits the inside design 130 to show through when illuminated, yet disappear from the outer shade when not illuminated may also be utilized. For example, any configuration operable to form a shadow of the interior design element 140 onto the exterior surface 110 of the body 100 may be utilized. In addition to altering thickness, the density, pigmentation, and/or materials forming the design elements 130, 140 and/or the body 100 may be selected to provide the desired light transmission values.

The type of images formed by the design elements 130, 140 is not particularly limited. The interior 140 and exterior 130 design elements may be individual designs that form a composite image and/or may be portions of a complete image revealed when the luminary device is illuminated.

The type of luminary device may include, but is not limited to, desk lamps, floor lamps, pendant lamps, sconces, night lights, etc.

Thus, it is intended that the present invention covers the modifications and variations of this invention provided they come within the scope of the appended claims and their equivalents. It is to be understood that terms such as "top", "bottom", "front", "rear", "side", "height", "length", "width", "upper", "lower", "interior", "exterior", and the like as may be used herein, merely describe points of reference and do not limit the present invention to any particular orientation or configuration.

I claim:

1. A lampshade for use with a light source comprising:
   a body comprising:
      an interior surface configured to face the light source, and
      an exterior surface configured to face a viewer of the lampshade;
   a first design element formed on the exterior surface of the body; and
   a second design element formed on the interior surface of the body,
   wherein, when the light source is extinguished, only the first design element is viewable on the exterior surface of the body, and when the light source is illuminated, both the first and second design elements are viewable on the exterior surface of the body.

2. The lampshade of claim 1, wherein:
   the body possesses a unitary, seamless structure; and
   the first and second design elements are formed into the surfaces such that they are integral with the body.

3. The lampshade of claim 1, wherein the first and second design elements are complementary images operable to display a composite image to a viewer when the light source is illuminated.

4. The lampshade of claim 1, wherein:
   the interior design element is defined by a raised portion extending from or a recessed portion formed into the interior body surface; and
   the exterior design element is defined by raised portion extending from or a recessed portion formed into the exterior body surface.

5. The lampshade of claim 4, wherein the first and second design elements comprise ribs extending from the surfaces of the body.

6. The lampshade of claim 5 further including a third design element comprising a groove recessed into a surface of the body.

7. The lampshade of claim 5, wherein:
   the first design element comprises a rib extending from the exterior surface; and
   the second design element comprises a groove recessed into the interior surface of the body.

8. The lampshade of claim 1, wherein the thickness value of the body measured at a point including the first or second design element differs from the thickness value of the body at a point not including the first or second design element.

9. The lampshade of claim 1, wherein:
   the body at a point including the first design element possesses a first thickness value;
   the body at a point including the second design element possesses a second thickness value;
   the body at a point not including the first or second design elements possesses a third thickness value; and
   each thickness value differs from the other thickness values.

10. The lampshade of claim 1, wherein:
the first design element possesses a first light transmission value;
the second design element possesses a second light transmission value;
the body portions not including the first or second design elements possesses a third light transmission value; and
the first, second, and third transmission values differ from each other.

11. The lampshade of claim 1, wherein the body defines a channel having a first, open end and a second, closed end.

12. A lampshade for use with a light source comprising:
a body comprising:
an interior surface configured to face the light source, and
an exterior surface configured to face a viewer of the lampshade;
a first design element formed into the exterior surface of the body, the first design element comprising a raised rib extending transversely from exterior surface of the body; and
a second design element formed into the interior surface of the body, the second design element comprising a raised rib extending transversely from exterior surface of the body;
wherein, when the light source is extinguished, only the first design element is visible to a viewer of the exterior surface of the body, and, when the light source is illuminated, both the first and second design elements are visible to a viewer of the exterior surface of the body.

13. The lampshade of claim 12 further comprising a third design element formed on the body, the third design element comprising a groove recessed into the interior or exterior surface.

14. The lampshade of claim 12, wherein the body comprises a unitary, seamless structure.

15. A lamp assembly comprising:
a light source;
a cover disposed over the light source comprising:
a body having a first light transmission value, the body including an interior surface and an exterior surface;
a first design element formed on the exterior surface of the body, the first design element having a second light transmission value, the second light transmission value being different from the first light transmission value; and
a second design element formed on the interior surface of the body, the second design element having a third light transmission value, the third light transmission value being different from the first light transmission value,
wherein the lamp assembly operates in a first, single image mode, in which the light source is extinguished and only the first design element is visible to a viewer of the exterior surface of the cover, and in a second, composite image mode, in which both the first and second design elements are visible to a viewer of the exterior surface of the cover.

16. The lamp assembly of claim 15, wherein:
the body possesses a unitary structure;
the first and second design elements are formed integrally with the body.

17. The lamp assembly of claim 16, wherein:
the first design element is defined by a raised portion extending from or a groove recessed into the exterior surface of the body; and
the second design element is defined by a raised portion extending from or a groove recessed into the interior surface of the body.

18. The lamp assembly of claim 15, wherein the cover comprises moldable material.

19. The lamp assembly of claim 15, wherein the body defines a channel having a first, open end and a second, closed end.

20. The lamp assembly of claim 18, wherein the closed end further comprises a pass-through to permit the passage of an electrical cord.

21. The lamp assembly of claim 15, wherein the light transmission values are provided by varying the thickness of the lampshade at each of the first design element, the second design element, and the body areas not including first or second design element.

22. A method of displaying individual and composite images to a viewer, the method comprising
(a) obtaining a lampshade, the lampshade comprising
a unitary body including:
an interior surface configured to face a light source, and
an exterior surface configured to face a viewer of the lampshade;
a first design element formed onto the exterior surface of the body; and
a second design element formed onto the interior surface of the body,
wherein, when the light source is extinguished, the only first design element is viewable on the exterior surface of the body and, when the light source is illuminated, both the first and second design elements are viewable on the exterior surface; and
(b) illuminating the lampshade to direct light from the interior surface to the exterior surface,
wherein illumination the lampshade displays both the first and second design elements to a viewer of the exterior surface to form a composite image.

23. The lampshade of claim 22, wherein:
the body possesses a unitary, seamless structure; and
the first and second design elements are formed into the surfaces such that the design elements are integrated into the body.

24. The method of claim 22, wherein (b) comprises (b.1.) illuminating the interior surface of the lampshade with a light bulb positioned within the lampshade.

25. The method of claim 17, wherein:
the first design element is defined by rib extending from or a groove recessed into the exterior surface of the body; and
the second design element is defined by rib extending from or a groove recessed into the interior surface of the body.

26. A method of producing a cover for a light source comprising:
(a) forming a body including an interior surface and an exterior surface, the body possesses a unitary, seamless structure;
(b) forming a first raised or recessed area into the exterior surface of the body, the raised or recessed area defining a first design element; and
(c) forming a second raised or recessed area into the interior surface of the body, the raised or recessed area defining a second design element,
wherein the first design element possesses a first light transmission value, the second design element possesses a second light transmission value, and the body portions not including the first or second design elements possesses a third light transmission value.

* * * * *